(No Model.)  2 Sheets—Sheet 1.
C. T. SCHOEN.
CAR SPRING.
No. 255,200.  Patented Mar. 21, 1882.
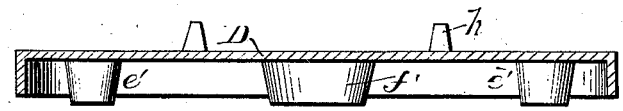
Fig. 1.
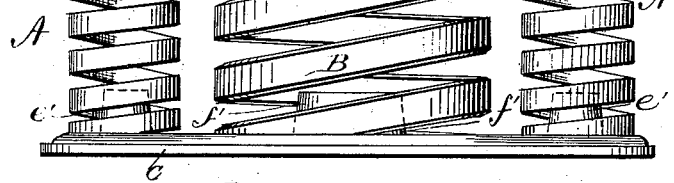
Fig. 2.
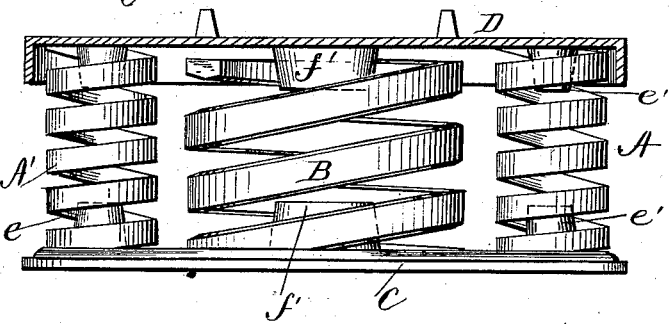
Fig. 3.
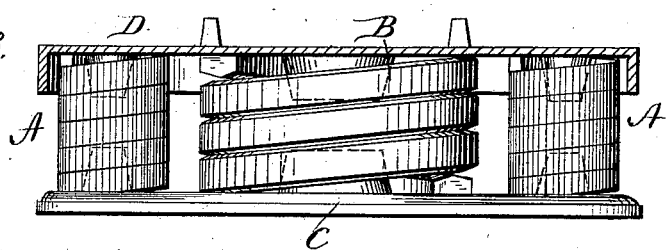
Fig. 4.
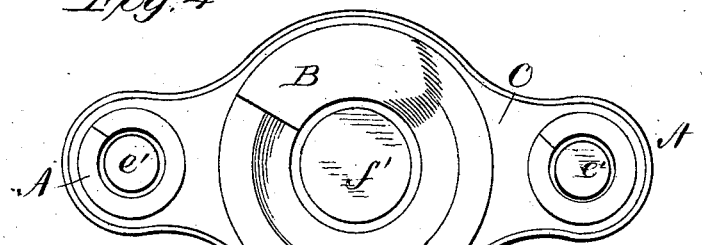
Witnesses.  Fig. 5.  Fig. 5*  Inventor,
F. L. Ouraud  Charles T. Schoen
A. M. Ridenour  by John J. Halsted & Son
  Attys.

(No Model.) 2 Sheets—Sheet 2.
C. T. SCHOEN.
CAR SPRING.
No. 255,200. Patented Mar. 21, 1882.
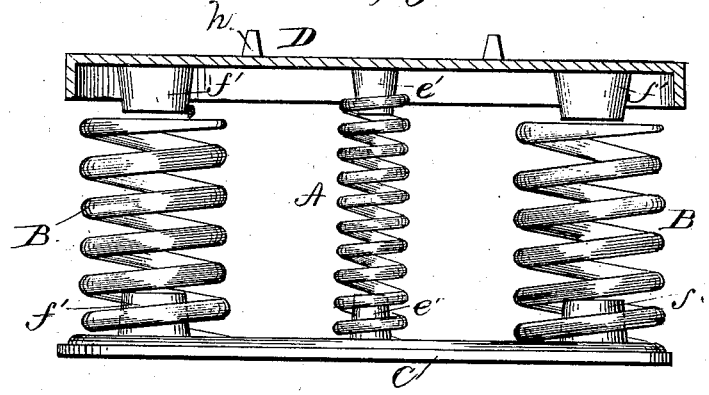
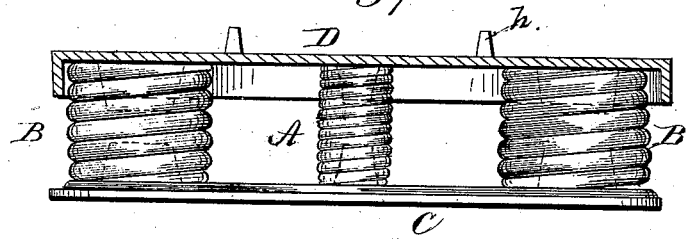
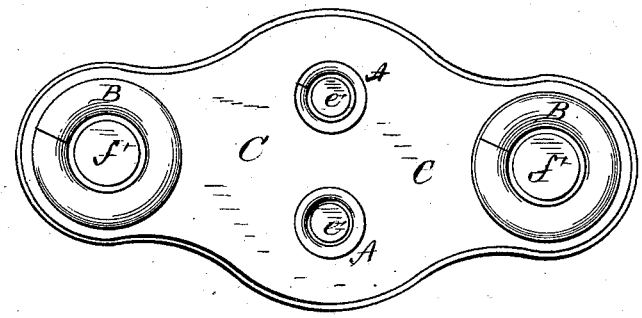
 
Witnesses
F. L. Ourand
A. M. Pidgeon
Inventor.
Charles T. Schoen
by John J. Halsted & Son
Attys.

UNITED STATES PATENT OFFICE.

CHARLES T. SCHOEN, OF PHILADELPHIA, PENNSYLVANIA, ASSIGNOR OF ONE-HALF TO CHARLES SCOTT, OF SAME PLACE.

CAR-SPRING.

SPECIFICATION forming part of Letters Patent No. 255,200, dated March 21, 1882.

Application filed November 21, 1881. (No model.)

*To all whom it may concern:*

Be it known that I, CHARLES T. SCHOEN, of Philadelphia, in the county of Philadelphia and State of Pennsylvania, have invented certain new and useful Improvements in Railroad-Car Springs; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a novel system of spiral springs as distinguished from volute springs or from rubber springs of any kind, and it is capable of adapting itself to a light or heavy load and of riding equally well with either.

In Sheet 1 of the drawings, Figure 1 represents, in side elevation, a railroad-car spring made in accordance with my invention, the upper bearing-plate being shown in section and as lifted out of its place the better to show the top of the springs. Fig. 2 is an elevation with the top plate in place, but in section; Fig. 3, the same with all the springs compressed, so as to become solid all at the same time. Fig. 4 is a plan, with the top plate removed, and Figs. 5 and 5* illustrate cross-sections of two forms of bar from which the coiled springs may be made. In Sheet 2, Fig. 6, my invention is illustrated by a group of four springs, the more powerful ones being placed one on each side of the weaker ones, which reach to a higher level. Fig. 7 is a similar sectional view with all these springs compressed to become solid at the same time. Fig. 8 is a plan of the same with the top plate removed, and Figs. 9 and 10 cross-sections of cylindrical bars of which any or all of my springs may be made.

In any case I use not less than three springs, though a greater number may be used, and the smaller ones, A A, in every case reach higher than the larger and more powerful spring or springs, B, and are placed by the side of it or them; but in no instance do I place the smaller ones inside of the coil of the larger ones. These springs all rest on the same bottom plate, C, and a single top plate, D, serves for them all, and both plates may have studs or projections $e'$ $e'$ $f'$ $f'$ to enter the coils and steady the springs; but the middle and larger stud, $f'$, when the springs are grouped, as in Figs. 1, 2, and 3, and when the top plate is in place, should preferably be long enough merely to enter the coil of the heavy or stronger spring, B, before the lighter springs, A, shall have been compressed.

Referring still to Sheet 1 of the drawings, the smaller springs, A, I make of such capacity as to render them very sensitive under slight pressure—say, for instance, of square steel of five-eighths ($\frac{5}{8}$) of an inch in cross-section, (see Fig. 5,)—and the more powerful single spring, B, may be made of, say, two and a quarter ($2\frac{1}{4}$) inches in cross-section, the form of the bar in its cross-section from which the stronger coil is made being as shown in Fig. 5*, and, preferably, to adapt it to the above-named smaller springs, about seven-eighths ($\frac{7}{8}$) of an inch thick at its edges and about one and a quarter ($1\frac{1}{4}$) inch thick at its center. The height of the large spring I make, say, five and a quarter ($5\frac{1}{4}$) inches, and the smaller springs should extend about one (1) inch above the stronger spring or springs, and both start from the same bed, while there is ample clear space above the stronger spring or springs, so that it or they cannot come into action until the desired period—namely, when the load is too much for the lighter springs alone and needs the power of the larger one or ones.

The sizes, shapes, and proportions of the bars above named are desirable and efficient practically; but I may vary from them as circumstances may demand.

By this mode of construction that stiffness or rigidity which exists in a single spring, or in a group of springs of uniform height, and all brought into action at the initial pressure, is entirely avoided, because my more powerful spring or springs, which is a reserve to sustain the greatest portion of the load only when needed, is not brought into action at all when the car or its load is light, nor can it be until the pressure is first brought to bear upon the weaker spring or springs.

I am aware that graduated springs have been made with one coil or spring encircled by another—that is, coil within coil—and one of such nest of coils extending above the other; but there are practical disadvantages incident to such mode of construction which are apparent, and which my improvement entirely avoids. The outer or encircling spiral must in such case be so large, or, in other words, the diameter of the hole through its center must be so large, in order to admit within the inside or core another spring or springs, that it requires a very great quantity of metal to afford a comparatively small amount of strength in the spring, and besides this the inner or surrounded coils must of necessity be made so small in order to get them inside the larger one and yet work freely that they are not well adapted to the service required.

By my mode of construction the springs, when fully compressed, become solid all at the same time, and I gain thereby greater capacity and at a much less cost. For instance, a spring made of three spirals weighing sixty (60) pounds, the larger one of them weighing, say, forty-four (44) pounds and the smaller ones, say, eight (8) pounds each, requires, say, forty-five thousand (45,000) pounds to compress them solid, and such a spring has a range of motion of, say, two (2) inches. Now, if the smaller springs were to become solid at, say, one and a half inch of compression, this would exhaust the yielding power of the group of spirals and reduce the capacity of the entire spring about ten thousand (10,000) pounds, thereby needlessly increasing its cost about twenty-five per cent.; or, in other words, the larger spiral would have, say, a half-inch of its possible range of motion absolutely lost because it could not be used on account of the smaller springs being closed.

Springs constructed all of uniform height and size are not only more rigid than in my invention, but they require twenty-five per cent. more steel in their construction, thus adding so much more to the cost, and, owing to their rigidity, the wear and tear on the rolling-stock with an empty car or light load is fully fifty per cent. greater than with my graduated spring.

I am also aware that volute springs have been made with interior coils wound to project beyond the exterior ones, thus forming a sort of cone shape, the pressure being received directly on the center or apex of such cone, and that a shorter volute of such construction, but not having any greater sustaining power, has been placed between other and longer similar volutes; but I distinctly disclaim volute springs of any kind, as they, as well as rubber springs, are not adapted for bolster-springs for heavily-laden freight-cars, and if they were they would occupy too much space for use, and are not sufficiently durable and reliable, and would cost one hundred per cent. more than springs above described by me. By my mode of construction, however, all such disadvantages are avoided, and the metal of any and all the springs employed can be so proportioned relative to its or their size, or to other springs used, as to utilize it to the very best advantage as to economy in cost, yielding quality, and durability in service, because I am not restricted in the diameter of any one spring relatively to the other, nor, as a consequence, to the thickness or strength of one spring relatively to another, as in the case where one coil is placed inside another; nor can my springs in any way interfere one with another.

In some cases the center coil or coils may reach the highest, and the outer ones reach to a lesser height and be the stronger ones, (see, for example, Sheet 2 of the drawings,) and, as before intimated, I do not confine myself to three springs, but may use any desired number without departing from the spirit of my invention.

It will also be observed that by my construction I avoid the need of using a series of followers acting successively, and consequently all liability of derangement due to their use, my single integral top plate doing of itself the whole duty of acting on some or on all the springs, as required by the load.

A bolt (not necessary to be shown) should pass through the centers of each of the smaller springs to hold the bearing-plates C and D together, and pins or dowels $h$ are made on the top plate to hold the spring in position under the bolster.

I do not herein lay any claim to rubber springs of any sort, nor to incased springs, nor to a group of springs having a series or succession of followers; nor do I limit myself to the form or shape in cross-section of the bar or bars of which the spirals may be made, as they may be round, oval, or of any other form which may be found desirable or advantageous, the essential features of my invention being that the more powerful spiral or spirals shall not come into action except under a heavy load, that the weaker spirals shall not be within the coils of the stronger ones, and that all the spirals shall become solid at practically the same time.

I claim—

A graduated bolster-spring for railroad-cars, composed of a group of spirally-coiled bars placed side by side, and in which the spiral or spirals having the greatest bearing and carrying capacity, is not acted on by the load till after the other and weaker spirals of the group have been brought into action, and in which all the spirals under a given pressure shall become solid at the same time, all substantially as set forth.

CHARLES T. SCHOEN.

Witnesses:
CHAS. M. LUKENS,
THOS. M. MONTGOMERY.